United States Patent
Steer et al.

(10) Patent No.: US 9,635,695 B2
(45) Date of Patent: *Apr. 25, 2017

(54) DETERMINING DEVICE IN-RANGE PROXIMITY

(71) Applicant: BlackBerry Limited, Waterloo (CA)

(72) Inventors: David Gwyn Steer, Nepean (CA); Dongsheng Yu, Nepean (CA); Robert Novak, Stittsville (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/750,633

(22) Filed: Jun. 25, 2015

(65) Prior Publication Data

US 2015/0296555 A1 Oct. 15, 2015

Related U.S. Application Data

(63) Continuation of application No. 13/643,241, filed as application No. PCT/IB2011/050829 on Feb. 25, 2011, now Pat. No. 9,084,235.

(51) Int. Cl.
*H04B 7/00* (2006.01)
*H04W 76/02* (2009.01)
(Continued)

(52) U.S. Cl.
CPC ....... *H04W 76/023* (2013.01); *H04L 63/0876* (2013.01); *H04W 4/20* (2013.01);
(Continued)

(58) Field of Classification Search
None
See application file for complete search history.

(56) References Cited

U.S. PATENT DOCUMENTS 5,666,661 A  9/1997 Grube et al.
7,027,820 B2  4/2006 Spratt
(Continued)

FOREIGN PATENT DOCUMENTS

CN  201173970 Y  12/2008
CN  101387882 A  3/2009
(Continued)

OTHER PUBLICATIONS

Notice of Allowance dated Aug. 26, 2015; U.S. Appl. No. 13/583,499, filed Sep. 7, 2012; 15 pages.
(Continued)

*Primary Examiner* — Tuan A Tran
(74) *Attorney, Agent, or Firm* — Conley Rose, P.C.; J. Robert Brown, Jr.; Albert A. Abbou

(57) ABSTRACT

Devices and methods are provided for determining the proximity of client nodes within a wireless-enabled communication environment. A first client node comprises a database containing identification data associated with a plurality of wireless network access nodes and fingerprint data associated with the client node and a plurality of second client nodes. As the fingerprint information is updated, it is processed by the first client node to identify second client nodes that have matching, or similar, fingerprint information. Those that do are determined to be within a viable device-to-device (D2D) communication range.

22 Claims, 5 Drawing Sheets

(51) Int. Cl.
*H04L 29/06* (2006.01)
*H04W 12/06* (2009.01)
*H04W 4/20* (2009.01)
*H04W 4/02* (2009.01)
*H04W 8/18* (2009.01)
*H04W 24/10* (2009.01)
*H04W 64/00* (2009.01)
*H04W 76/04* (2009.01)

(52) U.S. Cl.
CPC ............ *H04W 12/06* (2013.01); *H04W 4/023* (2013.01); *H04W 8/18* (2013.01); *H04W 24/10* (2013.01); *H04W 64/00* (2013.01); *H04W 76/043* (2013.01)

(56) References Cited

U.S. PATENT DOCUMENTS

| | | | |
|---|---|---|---|
| 7,164,930 B2* | 1/2007 | Korneluk | H04W 76/043 455/41.2 |
| 7,254,400 B1 | 8/2007 | Sakakura | |
| 7,444,137 B1 | 10/2008 | McNamara et al. | |
| 8,010,131 B2* | 8/2011 | Rothschild | H04W 76/02 455/414.1 |
| 8,358,609 B1* | 1/2013 | Cona | G01C 21/3415 370/315 |
| 8,521,194 B2* | 8/2013 | Laroia | H04W 76/023 370/329 |
| 8,554,200 B2* | 10/2013 | Ribeiro | H04W 72/082 455/422.1 |
| 8,588,803 B2* | 11/2013 | Hakola | H04W 72/085 370/310.2 |
| 8,639,819 B2* | 1/2014 | Pohja | H04M 1/7253 370/329 |
| 8,666,403 B2* | 3/2014 | Yu | H04W 60/00 455/406 |
| 9,084,235 B2 | 7/2015 | Steer et al. | |
| 2002/0029258 A1* | 3/2002 | Mousseau | G06Q 10/107 709/218 |
| 2004/0203472 A1 | 10/2004 | Chien | |
| 2005/0073443 A1 | 4/2005 | Sheha et al. | |
| 2006/0148502 A1 | 7/2006 | Korneluk et al. | |
| 2006/0240855 A1 | 10/2006 | Kalhan | |
| 2007/0153747 A1 | 7/2007 | Pan et al. | |
| 2007/0233840 A1 | 10/2007 | Alstrup et al. | |
| 2008/0139114 A1 | 6/2008 | Ranganathan | |
| 2008/0298280 A1 | 12/2008 | Joshi et al. | |
| 2008/0310376 A1 | 12/2008 | Ban et al. | |
| 2008/0318592 A1 | 12/2008 | Mandalia | |
| 2010/0085947 A1 | 4/2010 | Ringland et al. | |
| 2010/0144274 A1 | 6/2010 | McDowall et al. | |
| 2010/0261469 A1 | 10/2010 | Ribeiro et al. | |
| 2011/0051642 A1 | 3/2011 | Krishnaswamy | |
| 2011/0163914 A1 | 7/2011 | Seymour | |
| 2013/0331135 A1 | 12/2013 | Novak et al. | |

FOREIGN PATENT DOCUMENTS

| | | |
|---|---|---|
| CN | 101617346 A | 12/2009 |
| EP | 1385345 A1 | 1/2004 |
| GB | 2390510 A | 1/2004 |
| WO | 0115387 A1 | 3/2001 |
| WO | 2008107697 A1 | 9/2008 |
| WO | 2009027354 A2 | 3/2009 |
| WO | 2010038139 A1 | 4/2010 |
| WO | 2012114160 A1 | 8/2012 |

OTHER PUBLICATIONS

Novak, Robert, et al.; U.S. Appl. No. 14/992,346, filed Jan. 11, 2016; Title: Inter-Device Session Connectivity Enhancement; 50 pages.
Office Action dated Mar. 10, 2016; U.S. Appl. No. 14/992,346, filed Jan. 11, 2016; 14 pages.
Canadian Office Action; Application No. 2,828,074; Feb. 1, 2016; 3 pages.
Chinese Office Action as Received in Co-pending Application No. 201180068407.2 on Jan. 18, 2016; 7 pages.
Chinese Office Action as Received in Co-pending Application No. 201180070412.7 on Feb. 4, 2016; 6 pages.
Cohen, Alan; "RF Fingerprinting Pinpoints Location"; Network World; http://www.networkworld.com/news/tech/2004/101104techupdate.html; Oct. 11, 2004; 2 pages.
Lin, Hsiuping, et al.; "Enhanced Indoor Locationing in a Congested Wi-Fi Environment"; Carnegie Mellon University; Silicon Valley; MRC-TR-2009-04; Mar. 2009; 16 pages.
Pandya, Dhruv, et al.; "Indoor Location Estimation Using Multiple Wireless Technologies"; The 14th IEEE 2003 International Symposium on Personal, Indoor and Mobile Radio Communication Proceedings; 2003; 5 pages.
Tran, Kha, et al.; "Indoor Location Prediction Using Multiple Wireless Received Signal Strengths"; Proceedings of the 7th Australasian Data Mining Conference; Australian Computer Society; 2008; 6 pages.
Office Action dated Dec. 31, 2014; U.S. Appl. No. 13/583,499, filed Sep. 7, 2012; 15 pages.
Final Office Action dated May 28, 2015; U.S. Appl. No. 13/583,499, filed Sep. 7, 2012; 20 pages.
Office Action dated Jul. 31, 2014; U.S. Appl. No. 13/643,241, filed Oct. 29, 2013; 11 pages.
Notice of Allowance dated Nov. 21, 2014; U.S. Appl. No. 13/643,241, filed Oct. 29, 2013; 7 pages.
Notice of Allowance dated Mar. 3, 2015; U.S. Appl. No. 13/643,241, filed Oct. 29, 2013; 9 pages.
PCT International Search Report; Application No. PCT/IB2011/050828; Aug. 22, 2011; 3 pages.
PCT Written Opinion of the International Searching Authority; Application No. PCT/IB2011/050828; Aug. 22, 2011; 5 pages.
Canadian Office Action; Application No. 2,828,074; Feb. 26, 2015; 4 pages.
PCT International Search Report; Application No. PCT/IB2011/050829; Sep. 1, 2011; 3 pages.
PCT Written Opinion of the International Searching Authority; Application No. PCT/IB2011/050829; Sep. 1, 2011; 6 pages.
Canadian Office Action; Application No. 2,827,866; Nov. 13, 2014; 3 pages.
Notice of Allowance dated Jul. 6, 2016; U.S. Appl. No. 14/992,346, filed Jan. 11, 2016; 9 pages.
Chinese Office Action as Received in Co-pending Application No. 201180068407.2 on Sep. 7, 2016; 6 pages.
Chinese Office Action as Received in Co-pending Application No. 201180070412.7 on Sep. 5, 2016; 5 pages.
European Extended Search Report; Application No. 11859635.2; Aug. 19, 2016; 7 pages.
Chinese Office Acion as Received in Co-pending Application No. 201180068407.2 on Jan. 20, 2017; 5 pages. (No English translation available).
European Extended Search Report; Application No. 11859206.2; Nov. 7, 2016; 9 pages.

* cited by examiner

DETERMINING DEVICE IN-RANGE PROXIMITY

CROSS-REFERENCE TO RELATED APPLICATIONS

This application is a continuation of U.S. patent application Ser. No. 13/643,241 filed Oct. 29, 2013 by David G. Steer, et al. entitled, "Determining Device In-Range Proximity" which is a National Stage Application of International Application No. PCT/IB2011/050829, filed Feb. 25, 2011 by David G. Steer, et al. entitled, "Determining Device In-Range Proximity" both of which are incorporated by reference herein as if reproduced in their entirety.

BACKGROUND

1. Technical Field

The present disclosure is directed in general to communications systems and methods of operating the same. In one embodiment, the present disclosure relates to devices and methods to determine the proximity of client nodes within a wireless-enabled communication environment.

2. Description of the Related Art

The use of mobile devices for inter-personal communication and access to information of all kinds has become increasingly popular in recent years. In general, users of mobile devices largely communicate with a community of interest. In many cases, it is not unusual for members of the community to be within close proximity to one another when communicating.

Nonetheless, traditional wireless communications technologies typically route a communication stream between two mobile devices through a base station or access point, even when they are in close proximity. This approach is wasteful of network resources as it consumes two radio channels corresponding to the access links when one could be sufficient if the mobile devices could communicate with each other directly.

However, there are issues associated with initiating local inter-device links to support device-to-device (D2) communication sessions. For example, mobile devices currently have no way of knowing whether they are close enough to one another for a direct, inter-device communication link to be practical. Furthermore, the proximity of mobile devices is particularly difficult to determine if the devices are within a building or other structure where signals used by common location systems to locate mobile devices, such as Global Positioning System (GPS), are not receivable.

BRIEF DESCRIPTION OF THE DRAWINGS

The present disclosure may be understood, and its numerous objects, features and utilities obtained, when the following detailed description is considered in conjunction with the following drawings, in which.

DETAILED DESCRIPTION

Figure 1:
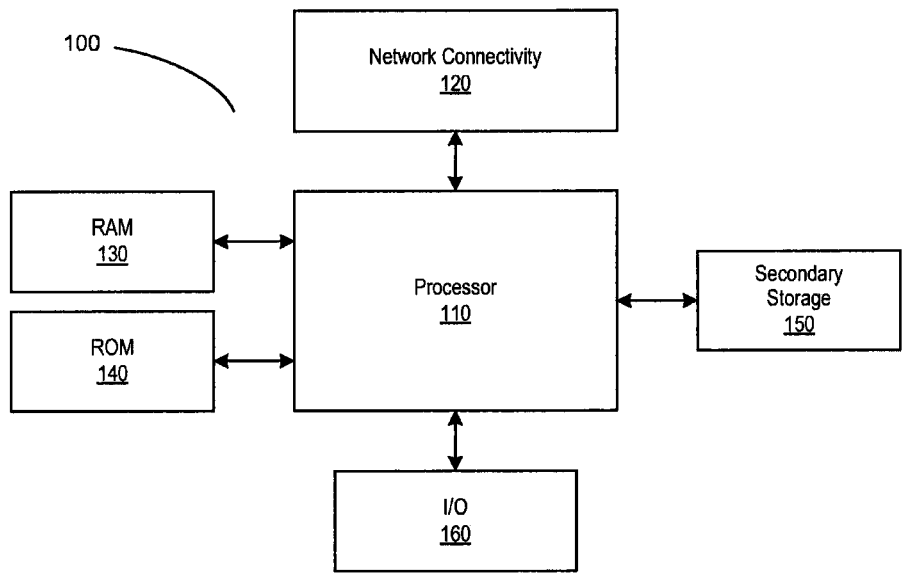
FIG. 1 depicts an exemplary system in which the present disclosure may be implemented.

Devices and methods are provided to determine the proximity of client nodes within a wireless-enabled communication environment. In various embodiments, a first client node comprises a database containing identification data associated with a plurality of wireless network access nodes and "fingerprint" data associated with the client node and a plurality of second client nodes. As will be understood by those of skill in the art, radio frequency (RF) "fingerprinting" is a process that identifies a cellular phone's location by the unique "fingerprint" characterizing its received signal environment. Accordingly, RF fingerprinting has been shown to be effective to accurately calculate the position of client nodes within a few meters within a cell.

In various embodiments of the present disclosure, signal fingerprint information is updated and is processed by the first client node to identify second client nodes that have matching, or similar, fingerprint information. Those that have matching, or similar, fingerprint information are determined to be within a viable device-to-device (D2D) communication range. Those that do not are determined to be outside of a viable D2D communication range.

In these various embodiments, device-to-device communication (D2D) includes configurations of client nodes requiring cooperation of transmissions among client nodes that are in a similar local area. Such configurations may comprise client nodes operating in Multiple Input Multiple Output (MIMO) configurations, Cooperative Multipoint (CoMP) configurations, Interference Control (IC), direct device-to-device communications, and relaying of information among client nodes.

In these and other embodiments, radio signal measurement operations are individually performed by the first and second client nodes to generate radio signal measurement data associated with individual wireless network access nodes. The first and second client nodes then individually process identification data associated with the wireless access nodes and the radio signal measurement data to respectively generate their associated fingerprint data. In certain of these various embodiments, Global Positioning System (GPS) data and locale map data is likewise processed by the first and second client nodes to identify their respective locations. In one embodiment the identification data, GPS data, locale map data, and fingerprint data associated with a plurality of second client nodes is stored in a server node accessible by the client node. In another embodiment, the identification data, GPS data, locale map data, and fingerprint data associated with the plurality of second client nodes is downloaded from the server node by the client node and stored in its local database.

Various illustrative embodiments of the present disclosure will now be described in detail with reference to the accompanying figures. While various details are set forth in the following description, it will be appreciated that the present disclosure may be practiced without these specific details, and that numerous implementation-specific decisions may be made to the disclosure described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected features are shown in block diagram and flow chart form, rather than in detail, in order to avoid limiting or obscuring the present disclosure. In addition, some portions of the detailed descriptions provided herein are presented in terms of algorithms or operations on data within a computer memory. Such descriptions and representations are used by those skilled in the art to describe and convey the substance of their work to others skilled in the art.

As used herein, the terms "component," "system," and the like are intended to refer to a computer-related entity, either hardware, a combination of hardware and software, software, software in execution. For example, a component may be, but is not limited to being, a process running on a processor, a processor, an object, an executable, a thread of execution, a program, or a computer. By way of illustration, both an application running on a computer and the computer itself may be a component. One or more components may reside within a process or thread of execution and a component may be localized on one computer or distributed between two or more computers.

As likewise used herein, the term "node" broadly refers to a connection point, such as a redistribution point or a communication endpoint, of a communication environment, such as a network. Accordingly, such nodes refer to an active electronic device capable of sending, receiving, or forwarding information over a communications channel. Examples of such nodes include data circuit-terminating equipment (DCE), such as a modem, hub, bridge or switch, and data terminal equipment (DTE), such as a handset, a printer or a host computer (e.g., a router, workstation or server). Examples of local area network (LAN) or wide area network (WAN) nodes include computers, packet switches, cable modems, Data Subscriber Line (DSL) modems, and wireless LAN (WLAN) access points.

Examples of Internet or Intranet nodes include host computers identified by an Internet Protocol (IP) address, bridges and WLAN access points. Likewise, examples of nodes in cellular communication include base stations, base station controllers, home location registers, Gateway GPRS Support Nodes (GGSN), and Serving GPRS Support Nodes (SGSN).

Other examples of nodes include client nodes, server nodes, peer nodes and access nodes. As used herein, a client node may refer to wireless devices such as mobile telephones, smart phones, personal digital assistants (PDAs), handheld devices, portable computers, tablet computers, and similar devices or other user equipment (UE) that has telecommunications capabilities. Such client nodes may likewise refer to a mobile, wireless device, or conversely, to devices that have similar capabilities that are not generally transportable, such as desktop computers, set-top boxes, or sensors. Likewise, a server node, as used herein, refers to an information processing device (e.g., a host computer), or series of information processing devices, that perform information processing requests submitted by other nodes. As likewise used herein, a peer node may sometimes serve as client node, and at other times, a server node. In a peer-to-peer or overlay network, a node that actively routes data for other networked devices as well as itself may be referred to as a supernode.

An access node, as used herein, refers to a node that provides a client node access to a communication environment. Examples of access nodes include cellular network base stations and wireless broadband (e.g., WiFi, WiMAX, etc) access points, which provide corresponding cell and WLAN coverage areas. As used herein, a macrocell is used to generally describe a traditional cellular network cell coverage area. Such macrocells are typically found in rural areas, along highways, or in less populated areas. As likewise used herein, a microcell refers to a cellular network cell with a smaller coverage area than that of a macrocell. Such micro cells are typically used in a densely populated urban area. Likewise, as used herein, a picocell refers to a cellular network coverage area that is less than that of a microcell. An example of the coverage area of a picocell may be a large office, a shopping mall, or a train station. A femtocell, as used herein, currently refers to the smallest commonly accepted area of cellular network coverage. As an example, the coverage area of a femtocell is sufficient for homes or small offices.

In general, a coverage area of less than two kilometers typically corresponds to a microcell, of about 200 meters or less for a picocell, and on the order of about 10 meters for a femtocell. As likewise used herein, a client node communicating with an access node associated with a macrocell is referred to as a "macrocell client." Likewise, a client node communicating with an access node associated with a microcell, picocell, or femtocell is respectively referred to as a "microcell client," "picocell client," or "femtocell client."

The term "article of manufacture" (or alternatively, "computer program product") as used herein is intended to encompass a computer program accessible from any computer-readable device or media. For example, computer readable media may include but are not limited to magnetic storage devices (e.g., hard disk, floppy disk, magnetic strips, etc.), optical disks such as a compact disk (CD) or digital versatile disk (DVD), smart cards, and flash memory devices (e.g., card, stick, etc.).

The word "exemplary" is used herein to mean serving as an example, instance, or illustration. Any feature or design described herein as "exemplary" is not necessarily to be construed as preferred or advantageous over other features or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement features detailed herein.

FIG. 1 illustrates an example of a system 100 suitable to implement one or more embodiments disclosed herein. In various embodiments, the system 100 comprises a processor 110, which may be referred to as a central processor unit (CPU) or digital signal processor (DSP), network connectivity devices 120, random access memory (RAM) 130, read only memory (ROM) 140, secondary storage 150, and input/output (I/O) devices 160. In some embodiments, some of these components may not be present or may be combined in various combinations with one another or with other components not shown. These components may be located in a single physical entity or in more than one physical entity. Any actions described herein as being taken by the processor 110 might be taken by the processor 110 alone or by the processor 110 in conjunction with one or more components shown or not shown in FIG. 1.

The processor 110 executes instructions, codes, computer programs, or scripts that it might access from the network connectivity devices 120, RAM 130, or ROM 140. While only one processor 110 is shown, multiple processors may be present. Thus, while instructions may be discussed as being executed by a processor 110, the instructions may be executed simultaneously, serially, or otherwise by one or multiple processors 110 implemented as one or more CPU chips.

In various embodiments, the network connectivity devices 120 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks, including Personal Area Networks (PANs) such as Bluetooth. These network connectivity devices 120 may enable the processor 110 to communicate with the Internet or one or more telecommunications networks or other networks from which the processor 110 might receive information or to which the processor 110 might output information.

The network connectivity devices 120 may also be capable of transmitting or receiving data wirelessly in the form of electromagnetic waves, such as radio frequency signals or microwave frequency signals. Information transmitted or received by the network connectivity devices 120 may include data that has been processed by the processor 110 or instructions that are to be executed by processor 110. The data may be ordered according to different sequences as may be desirable for either processing or generating the data or transmitting or receiving the data.

In various embodiments, the RAM 130 may be used to store volatile data and instructions that are executed by the processor 110. The ROM 140 shown in FIG. 1 may be used to store instructions and perhaps data that are read during execution of the instructions. Access to both RAM 130 and ROM 140 is typically faster than to secondary storage 150. The secondary storage 150 is typically comprised of one or more disk drives or tape drives and may be used for non-volatile storage of data or as an over-flow data storage device if RAM 130 is not large enough to hold all working data. Secondary storage 150 may be used to store programs that are loaded into RAM 130 when such programs are selected for execution. The I/O devices 160 may include liquid crystal displays (LCDs), Light Emitting Diode (LED) displays, Organic Light Emitting Diode (OLED) displays, projectors, televisions, touch screen displays, keyboards, keypads, switches, dials, mice, track balls, voice recognizers, card readers, paper tape readers, printers, video monitors, or other well-known input/output devices.

Figure 2:
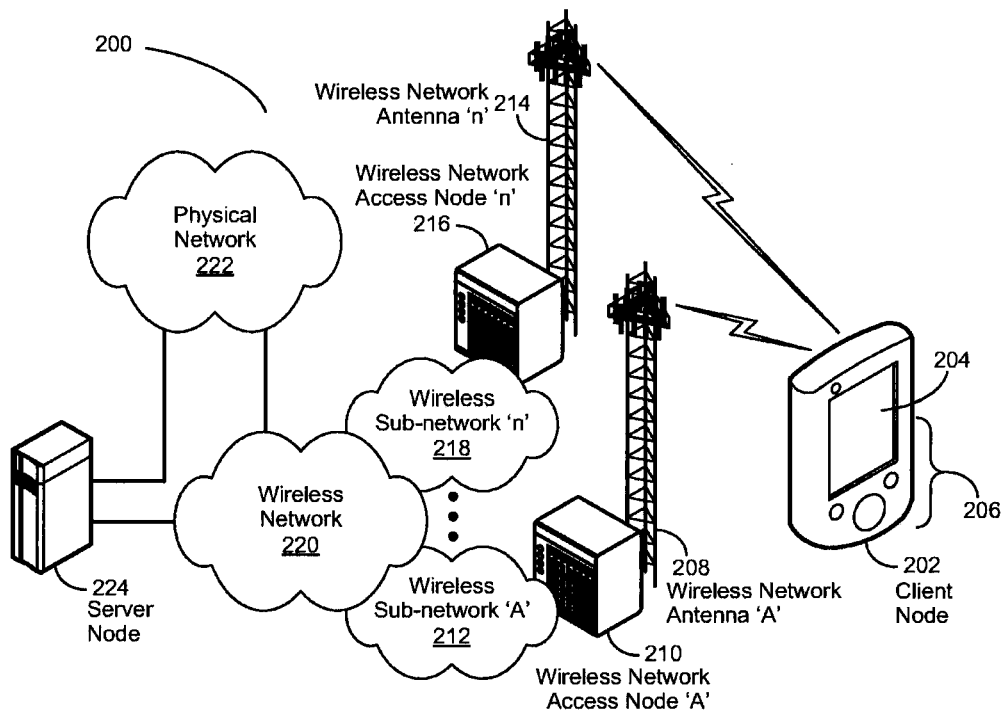
FIG. 2 shows a wireless-enabled communications environment including an embodiment of a client node.

FIG. 2 shows a wireless-enabled communications environment including an embodiment of a client node as implemented in an embodiment of the disclosure. Though illustrated as a mobile phone, the client node 202 may take various forms including a wireless handset, a pager, a smart phone, or a personal digital assistant (PDA). In various embodiments, the client node 202 may also comprise a portable computer, a tablet computer, a laptop computer, or any computing device operable to perform data communication operations. Many suitable devices combine some or all of these functions. In some embodiments, the client node 202 is not a general purpose computing device like a portable, laptop, or tablet computer, but rather is a special-purpose communications device such as a telecommunications device installed in a vehicle. The client node 202 may likewise be a device, include a device, or be included in a device that has similar capabilities but that is not transportable, such as a desktop computer, a set-top box, or a network node. In these and other embodiments, the client node 202 may support specialized activities such as gaming, inventory control, job control, task management functions, and so forth.

In various embodiments, the client node 202 includes a display 204. In these and other embodiments, the client node 202 may likewise include a touch-sensitive surface, a keyboard or other input keys 206 generally used to input one or more selections by a user. The input keys 206 may likewise be a full or reduced alphanumeric keyboard such as QWERTY, Dvorak, AZERTY, and sequential keyboard types, or a traditional numeric keypad with alphabet letters associated with a telephone keypad. The input keys 206 may likewise include a trackwheel, an exit or escape key, a trackball, and other navigational or functional keys, which may be inwardly depressed to provide further input function. The client node 202 may likewise present options selectable by the user, controls for the user to actuate, and cursors or other indicators for the user to direct.

The client node 202 may further accept data entry from the user, including numbers to dial or various parameter values to configure the operation of the client node 202. The client node 202 may further execute one or more software or firmware applications in response to user commands. These applications may configure the client node 202 to perform various customized functions in response to user interaction. Additionally, the client node 202 may be programmed or configured over-the-air (OTA), for example from a wireless network access node 'A' 210 through 'n' 216 (e.g., a base station), a server node 224 (e.g., a host computer), or a peer client node 202.

Among the various applications executable by the client node 202 are a web browser, which enables the display 204 to display a web page. The web page may be obtained from a server node 224 through a wireless connection with a wireless network 220. The various applications may likewise be obtained from a peer client node 202 or other system over a connection to the wireless network 220 or any other wireless communication network or system. In various embodiments, the wireless network 220 comprises a plurality of wireless sub-networks (e.g., cells with corresponding coverage areas) 'A' 212 through 'n' 218. In these and other embodiments, the client node 202 transmits and receives communication signals, which are respectively communicated to and from the wireless network nodes 'A' 210 through 'n' 216 by wireless network antennas 'A' 208 through 'n' 214 (e.g., cell towers). In turn, the communication signals are used by the wireless network access nodes 'A' 210 through 'n' 216 to establish a wireless communication session with the client node 202. In turn, the wireless network access points 'A' 210 through 'n' 216 are respectively coupled to wireless sub-networks 'A' 212 through 'n' 218, which are connected to the wireless network 220.

In various embodiments, the wireless network 220 is coupled to a physical network 222, such as the Internet. Via the wireless network 220 and the physical network 222, the client node 202 has access to information on various hosts, such as the server node 224. In these and other embodiments, the server node 224 may provide content that may be shown on the display 204. Alternately, the client node 202 may access the wireless network 220 through a peer client node 202 acting as an intermediary, in a relay type or hop type of connection. Alternately, the client node 202 is tethered and obtains its data from a tethered device that is connected to the wireless network 212. Skilled practitioners of the art will recognize that many such embodiments are possible and the foregoing is not intended to limit the spirit, scope, or intention of the disclosure.

Figure 3:
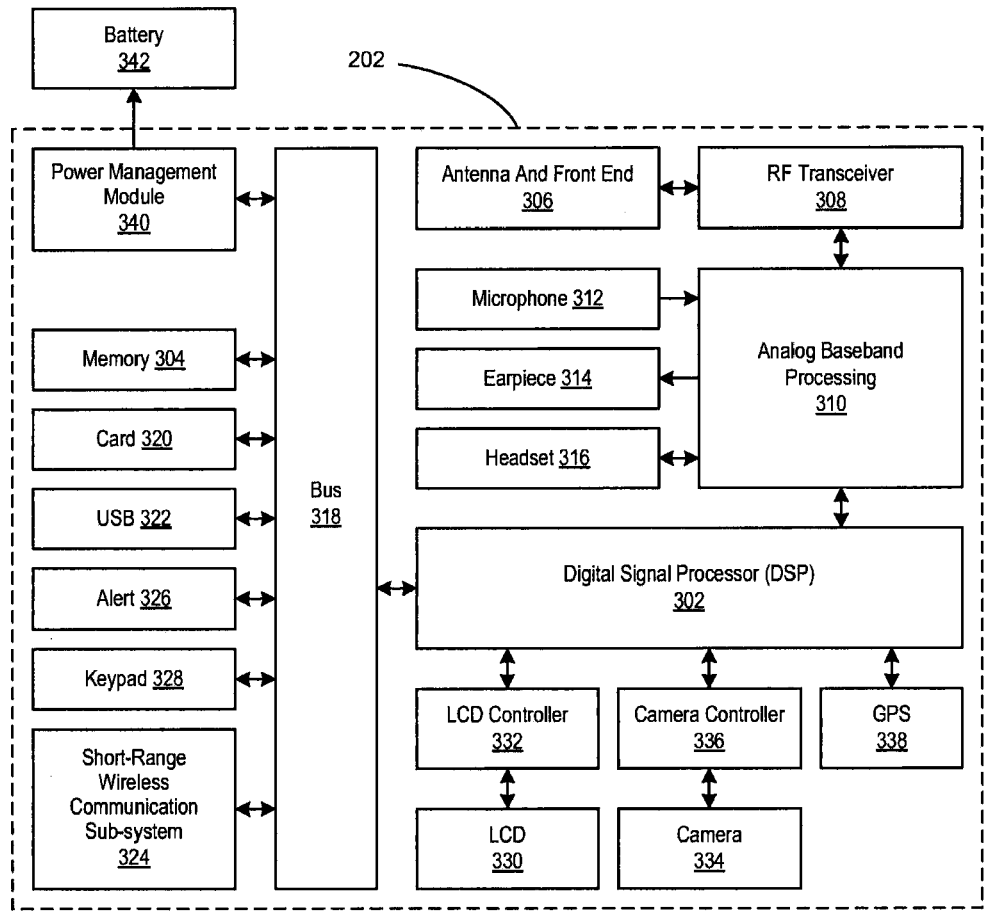
FIG. 3 is a simplified block diagram of an exemplary client node comprising a digital signal processor (DSP)

FIG. 3 depicts a block diagram of an exemplary client node as implemented with a digital signal processor (DSP) in accordance with an embodiment of the disclosure. While various components of a client node 202 are depicted, various embodiments of the client node 202 may include a subset of the listed components or additional components not listed. As shown in FIG. 3, the client node 202 includes a DSP 302 and a memory 304. As shown, the client node 202 may further include an antenna and front end unit 306, a radio frequency (RF) transceiver 308, an analog baseband processing unit 310, a microphone 312, an earpiece speaker 314, a headset port 316, a bus 318, such as a system bus or an input/output (I/O) interface bus, a removable memory card 320, a universal serial bus (USB) port 322, a short range wireless communication sub-system 324, an alert 326, a keypad 328, a liquid crystal display (LCD) 330, which may include a touch sensitive surface, an LCD controller 332, a charge-coupled device (CCD) camera 334, a camera controller 336, and a global positioning system (GPS) sensor 338, and a power management module 340 operably coupled to a power storage unit, such as a battery 342. In various embodiments, the client node 202 may include another kind of display that does not provide a touch sensitive screen. In one embodiment, the DSP 302 communicates directly with the memory 304 without passing through the input/output interface 318.

In various embodiments, the DSP 302 or some other form of controller or central processing unit (CPU) operates to control the various components of the client node 202 in accordance with embedded software or firmware stored in memory 304 or stored in memory contained within the DSP 302 itself. In addition to the embedded software or firmware, the DSP 302 may execute other applications stored in the memory 304 or made available via information carrier media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The antenna and front end unit 306 may be provided to convert between wireless signals and electrical signals, enabling the client node 202 to send and receive information from a cellular network or some other available wireless communications network or from a peer client node 202. In an embodiment, the antenna and front end unit 106 may include multiple antennas to support beam forming and/or multiple input multiple output (MIMO) operations. As is known to those skilled in the art, MIMO operations may provide spatial diversity which may be used to overcome difficult channel conditions or to increase channel throughput. Likewise, the antenna and front end unit 306 may include antenna tuning or impedance matching components, RF power amplifiers, or low noise amplifiers.

In various embodiments, the RF transceiver 308 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 310 or the DSP 302 or other central processing unit. In some embodiments, the RF Transceiver 108, portions of the Antenna and Front End 306, and the analog base band processing unit 310 may be combined in one or more processing units and/or application specific integrated circuits (ASICs).

The analog baseband processing unit 310 may provide various analog processing of inputs and outputs, for example analog processing of inputs from the microphone 312 and the headset 316 and outputs to the earpiece 314 and the headset 316. To that end, the analog baseband processing unit 310 may have ports for connecting to the built-in microphone 312 and the earpiece speaker 314 that enable the client node 202 to be used as a cell phone. The analog baseband processing unit 310 may further include a port for connecting to a headset or other hands-free microphone and speaker configuration. The analog baseband processing unit 310 may provide digital-to-analog conversion in one signal direction and analog-to-digital conversion in the opposing signal direction. In various embodiments, at least some of the functionality of the analog baseband processing unit 310 may be provided by digital processing components, for example by the DSP 302 or by other central processing units.

The DSP 302 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 302 may perform modulation, coding, interleaving, and spreading, and for a receiver function the DSP 302 may perform despreading, deinterleaving, decoding, and demodulation. In another embodiment, for example in an orthogonal frequency division multiplex access (OFDMA) technology application, for the transmitter function the DSP 302 may perform modulation, coding, interleaving, inverse fast Fourier transforming, and cyclic prefix appending, and for a receiver function the DSP 302 may perform cyclic prefix removal, fast Fourier transforming, deinterleaving, decoding, and demodulation. In other wireless technology applications, yet other signal processing functions and combinations of signal processing functions may be performed by the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB interface 322 and the short range wireless communication sub-system 324. The USB interface 322 may be used to charge the client node 202 and may also enable the client node 202 to function as a peripheral device to exchange information with a personal computer or other computer system. The short range wireless communication sub-system 324 may include an infrared port, a Bluetooth interface, an IEEE 802.11 compliant wireless interface, or any other short range wireless communication sub-system, which may enable the client node 202 to communicate wirelessly with other nearby client nodes and access nodes.

The input/output interface 318 may further connect the DSP 302 to the alert 326 that, when triggered, causes the client node 202 to provide a notice to the user, for example, by ringing, playing a melody, or vibrating. The alert 326 may serve as a mechanism to alert the user to any of various events such as an incoming call, a new text message, and an appointment reminder by silently vibrating, or by playing a specific pre-assigned melody corresponding to a particular caller.

The keypad 328 couples to the DSP 302 via the I/O interface 318 to provide one mechanism for the user to make selections, enter information, and otherwise provide input to the client node 202. The keyboard 328 may be a full or reduced alphanumeric keyboard such as QWERTY, Dvorak, AZERTY and sequential types, or a traditional numeric keypad with alphabet letters associated with a telephone keypad. The input keys may likewise include a trackwheel, an exit or escape key, a trackball, and other navigational or functional keys, which may be inwardly depressed to provide further input function. Another input mechanism may be the LCD 330, which may include touch screen capability and also display text and/or graphics to the user. The LCD controller 332 couples the DSP 302 to the LCD 330.

The CCD camera 334, if equipped, enables the client node 202 to take digital pictures. The DSP 302 communicates with the CCD camera 334 via the camera controller 336. In another embodiment, a camera operating according to a technology other than Charge Coupled Device cameras may be employed. The GPS sensor 338 is coupled to the DSP 302 to decode global positioning system signals, thereby enabling the client node 202 to determine its position. Various other peripherals may also be included to provide additional functions, such as radio and television reception.

Figure 4:
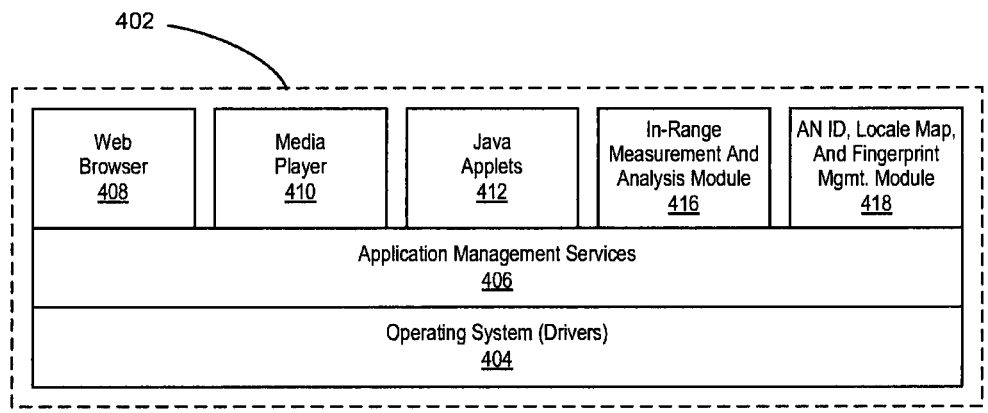
FIG. 4 is a simplified block diagram of a software environment that may be implemented by a DSP.

FIG. 4 illustrates a software environment 402 that may be implemented by a digital signal processor (DSP). In this embodiment, the DSP 302 shown in FIG. 3 executes an operating system 404, which provides a platform from which the rest of the software operates. The operating system 404 likewise provides the client node 202 hardware with standardized interfaces (e.g., drivers) that are accessible to application software. The operating system 404 likewise comprises application management services (AMS) 406 that transfer control between applications running on the client node 202. Also shown in FIG. 4 are a web browser application 408, a media player application 410, and Java applets 412. The web browser application 408 configures the client node 202 to operate as a web browser, allowing a user to enter information into forms and select links to retrieve and view web pages. The media player application 410 configures the client node 202 to retrieve and play audio or audiovisual media. The Java applets 412 configure the client node 202 to provide games, utilities, and other functionality.

In various embodiments, the short range wireless communication subsystem 324, in conjunction with the DSP 302 and other elements of the client node 202 illustrated in FIG. 3 are implemented to determine the proximity between two client nodes 202. In these and other embodiments, the aforementioned elements of the client node 202 are controlled by the in-range measurement and analysis module 416, which selects the channels to be measured, records the results, and then performs analysis operations to determine the in-range proximity of two mobile devices. Information from a database of wireless access node (AN) IDs, GPS, locale maps, and radio signal fingerprints received from other client nodes, as described in greater detail herein, may be managed by the AN ID, GPS, locale map, and fingerprint data management module 418 for provision to the in-range measurement and analysis module 416. In various embodiments, the client node 202, the wireless network nodes 'A' 210 through 'n' 216, and the server node 224 shown in FIG. 2 may likewise include a processing component that is capable of executing instructions related to the actions described above.

FIG. 4 is a simplified block diagram of a first client node as implemented in accordance with an embodiment of the disclosure to determine the proximity of a second client node within a wireless-enabled communication environment. In various embodiments, a client node (e.g., a mobile device) automatically determines the in-range proximity of other client nodes when in a locale (e.g., a building) that does not allow the receipt of conventional navigational signals (e.g. satellite GPS). In these and other embodiments, an in-range measurement and analysis module 416 is implemented in the client node to detect and measure various features of the radio signal environment at its current location. These measurements are then analyzed by comparing them to those from other client nodes known to be relatively proximate to the client node. The client nodes that measure the same, or similar, radio signal fingerprints of the radio environment are determined to be within sufficiently close proximity to one another for device-to-device (D2D) communications. The in-range measurement and analysis module 416 may make use of information managed by the AN ID, Locale Map and Fingerprint Management Module 418. In these various embodiments the Locale Map and Fingerprint Management Module 418 manages the tracking and updating of fingerprints associated with other client nodes.

Figure 5:
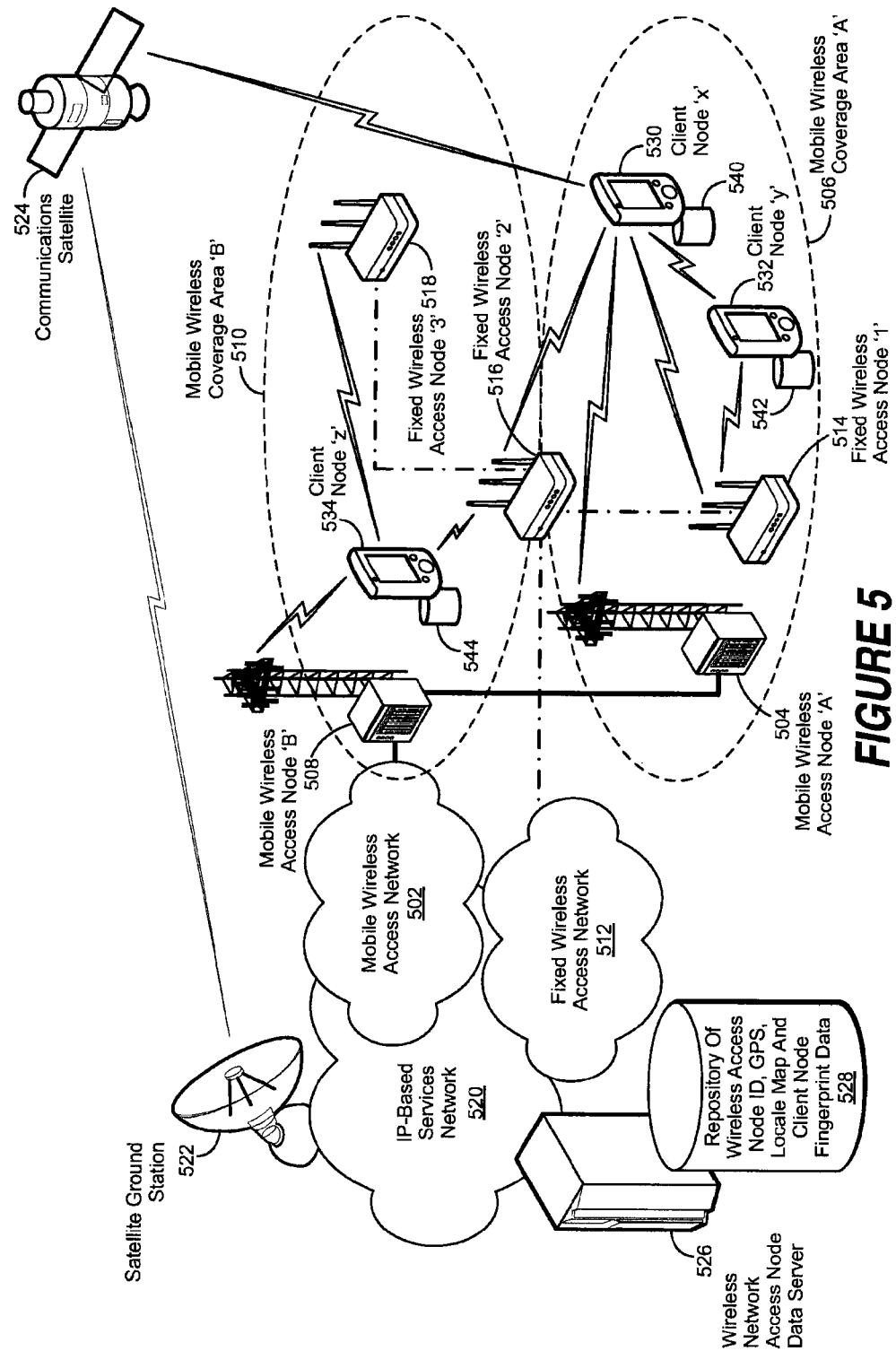
FIG. 5 is a simplified block diagram of a first client node as implemented to determine the proximity of a second client node within a wireless-enabled communication environment.

FIG. 5 is a simplified block diagram of a wireless-enabled communication environment and networks in which a first client node as implemented in accordance with an embodiment of the disclosure operates to determine the proximity of a second client node. In this embodiment, an Internet protocol (IP)-based services network 520, such as the Internet, comprises a wireless network access node data server 526, which further comprises a repository of wireless access node ID, GPS, locale map, and client node fingerprint data 528. The IP-based services network 520 likewise comprises a satellite ground station 522 operable to initiate, and subsequently conduct, a communications session with a communications session with a communications satellite 524. In turn, the communications satellite 524 is operable to initiate, and subsequently conduct, a communications session with a client node, such as client node 'x' 530.

As shown in FIG. 5, the IP-based services network 520 is interconnected to a mobile wireless access network 502, such as a cellular network, and to a fixed wireless access network 512, such as a network based on IEEE 802.11x or IEEE 802.16x technologies. As likewise shown in FIG. 5, the mobile wireless access network 502 comprises mobile wireless access nodes 'A' 504 and 'B' 508, which are interconnected and have respective mobile wireless coverage areas 'A' 506 and 'B' 510. As shown in FIG. 5, the client nodes 'x' 530 and 'y' 532 able to initiate, and subsequently conduct, a mobile wireless communications session within the mobile wireless coverage area 'A' 506 through the mobile wireless access node 'A' 504. Likewise, the client node 'z' 534 is able to initiate, and subsequently conduct, a mobile wireless communications session within the mobile wireless coverage area 'B' 510 through the mobile wireless access node 'B' 508. As likewise shown in FIG. 5, the fixed wireless access network 512 comprises fixed wireless access nodes '1' 514, '2' 516, and '3' 518, all of which are interconnected and are likewise connected to the IP-Based Services Network 520. As shown in FIG. 5, the fixed wireless access nodes T 514 and '3' 518 respectively reside within the mobile wireless coverage areas 'A' 506 and 'B' 510.

The client nodes 'x' 530 and 'y' 532, which likewise reside within the mobile wireless coverage area 'A' 506, are respectively able to initiate, and subsequently conduct, a fixed wireless communications sessions through the fixed wireless access node 'I' 514. The client node 'z' 534, which likewise resides within the mobile wireless coverage area 'B' 510, is able to initiate, and subsequently conduct, a fixed wireless communications sessions through the fixed wireless access node '3' 518. Likewise, the fixed wireless access node '2' 516 resides at the intersection of the mobile wireless coverage areas 'A' 506 and 'B' 510. Accordingly, as shown in FIG. 5, both client nodes 'x' 530 and 'z' 534 are able to initiate, and subsequently conduct, a fixed wireless communications sessions through the fixed wireless access nodes '2' 516. As likewise shown in FIG. 5, each of the client nodes 530, 532 and 534 respectively comprises its own repository 540, 542 and 544 of wireless access node ID, GPS, locale map, and client node fingerprint data.

Referring now to FIG. 5, the client node 'x' 530 uses its radio receivers to scan and measure the signals of the mobile wireless access node 'A' 504 and the fixed wireless access nodes T 514 and '2' 516. In various embodiments, the fixed wireless access nodes T 514 and '2' 516 may be wireless local area network (WLAN) access points operated by individuals, enterprises or network operators. Likewise, the fixed wireless access nodes T 514 and '2' 516 may be home-Node-B (h-NodeB) operating from a multiplicity of local homes and network operators. Those of skill in the art will recognize that many such examples of fixed wireless access nodes T 514 and '2' 516 are possible and that the foregoing is not intended to limit the spirit, scope or intent of the disclosure.

In these and other embodiments, the radio signal scanning and measurements performed by the client node 'x' 530 may be initiated by an event, such as an event at the client node 'x' 530 itself (e.g. change of environment, switch-on, service request, user request etc.) or an event at the mobile wireless access network 502 (e.g. cell handover, switch-on, etc.). In various embodiments, the scans and measurement operations may be performed by the client node 'x' 530 periodically, or aperiodically, to determine the signal strength, channel and ID of the fixed wireless access nodes T 514 and '2' 516, or other received radio signals, during the scanning operations. The client node 'x' 530 likewise measures the signal strength and cell site identification, including sector information, of the mobile wireless access node 'A' 504 to which it is connected, and neighboring mobile wireless access nodes (e.g., the mobile wireless access node 'B' 508). In one embodiment, the client node 'x' 530 measures the signal strength and other information associated a spot beam of the communications satellite 524.

In these various embodiments, the previously-described measurements may include not only the serving mobile and physical wireless access nodes 'A' 504, 'I' 514, and '2' 516, but also signals from mobile and physical wireless access nodes 'B' 508 and '3' 518 that may be received by the client node 'x' 530. Those of skill in the art will be aware that such measurements of the serving and the neighboring mobile and physical wireless access points are typically made by client nodes for the purpose of managing mobility among various access nodes. Accordingly, knowledge of the neighboring mobile and physical wireless access points 'B' 508 and '3' 518 may be used by the client node 'x' 530 to assist in identify itself within the mobile wireless coverage area 'A' 506 and to likewise ascertain proximity to other devices when they are in the mobile wireless coverage area 'A' 510.

Skilled practitioners of the art will likewise recognize that such location information may entail some degree of uncertainty due to the practical effects of multi-path propagation and shadowing by man-made and natural objects (e.g., buildings, hills, or other obstructions). Nonetheless, it is still useful for client node 'x' 530 when determining the proximity of client nodes 'y' 532 and 'z' 534. Likewise, when the client node 'x' 530 is operating within spot beams of the communications satellite 524, the neighboring beam information also may likewise assist in identifying client nodes (e.g., client node 'y' 532) generally within the beam coverage area. In various embodiments the measurements are complementary to other information (e.g. GPS and cell site positioning estimation), that may be available for some of the access nodes. In one embodiment, time stamps are reported together with the fingerprints so that the most recent information may be compared.

In various embodiments, the data delivery services implemented within the IP-based services network 520 are used to communicate the previously described measurements for reporting. In these and other embodiments, the measurement format and related content are configured by the IP-based services network 520 for optimal in-range location and communication of the measurements to the client nodes 'x' 530, 'y' 532, and 'z' 534. In these various embodiments, the information associated with the signals measured in proximity to the client node 'x' 530 (e.g. the fingerprint of the radio signals related to the mobile and physical wireless access nodes 'A' 504, 'B' 508, ' 1' 514, '2' 516, and '3' 518) are communicated to client nodes 'y' 532 and 'z' 534. In various other embodiments, the fingerprints are communicated to the wireless network access node data server 526, which may be stored in the repository of wireless access node ID, GPS, locale map, and client node fingerprint data 528.

As used herein, a local community of interest refers to a set of client nodes (e.g., client nodes 'x' 530 and 'y' 532) that reside in the same mobile wireless coverage area (e.g., mobile wireless coverage area 'A' 506). The local community of interest likewise refers to wireless coverage areas sufficiently close together such that D2D communication is possible between at least some access nodes (e.g., access node 'z' 534) are in adjacent or mobile wireless coverage areas (e.g., mobile wireless coverage area 'B' 510). Access nodes that are outside this range are determined to be beyond proximity range for viable D2D communications. In various embodiments, the measured information is only exchanged between the client nodes 'x' 530, 'y' 532, 'z' 534 or with the wireless network access node data server 526 if there was mutual agreement to be part of the same local community of interest. In certain of these various embodiments, a proprietary protocol is implemented to communicate among the client nodes 'x' 530, 'y' 532, 'z' 534 or with the wireless network access node data server 526.

In various embodiments, the client nodes that share a common proximity area as determined by the mobile wireless coverage areas 'A' 506 and 'B' 510, and that have shared their local measured fingerprint information, compare fingerprints to determine their relative proximity to each other. Client nodes having fingerprints that substantively match, or are correlated, are considered to be within in-range proximity capable of D2D communications. As an example, a substantial match would include the same set of mobile or physical wireless access points that have been measured and shown to have similar signal strengths. Those of skill in the art will appreciate that if the number of measured mobile wireless access nodes is small (e.g. 1 or 2) then the previously referenced signal strength should be above a predetermined threshold to assure that the client nodes are close to each other and not on opposite (i.e., more distant) sides of the physical wireless access network node.

Figure 6A:
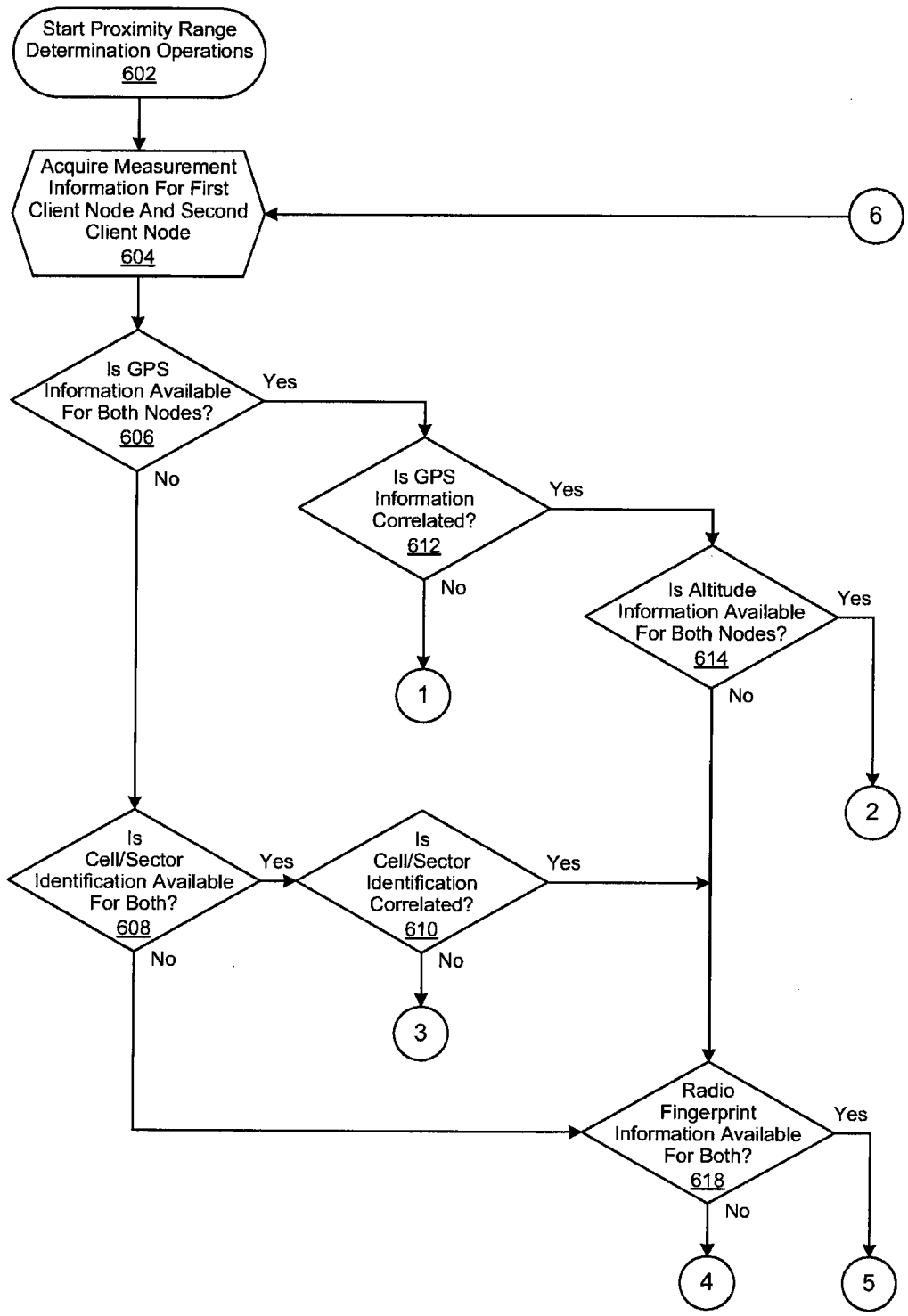
FIGS. 6a and 6b are a generalized flowchart of operations performed by a first client node to determine the proximity of a second client node within a wireless-enabled communication environment.
Figure 6B:
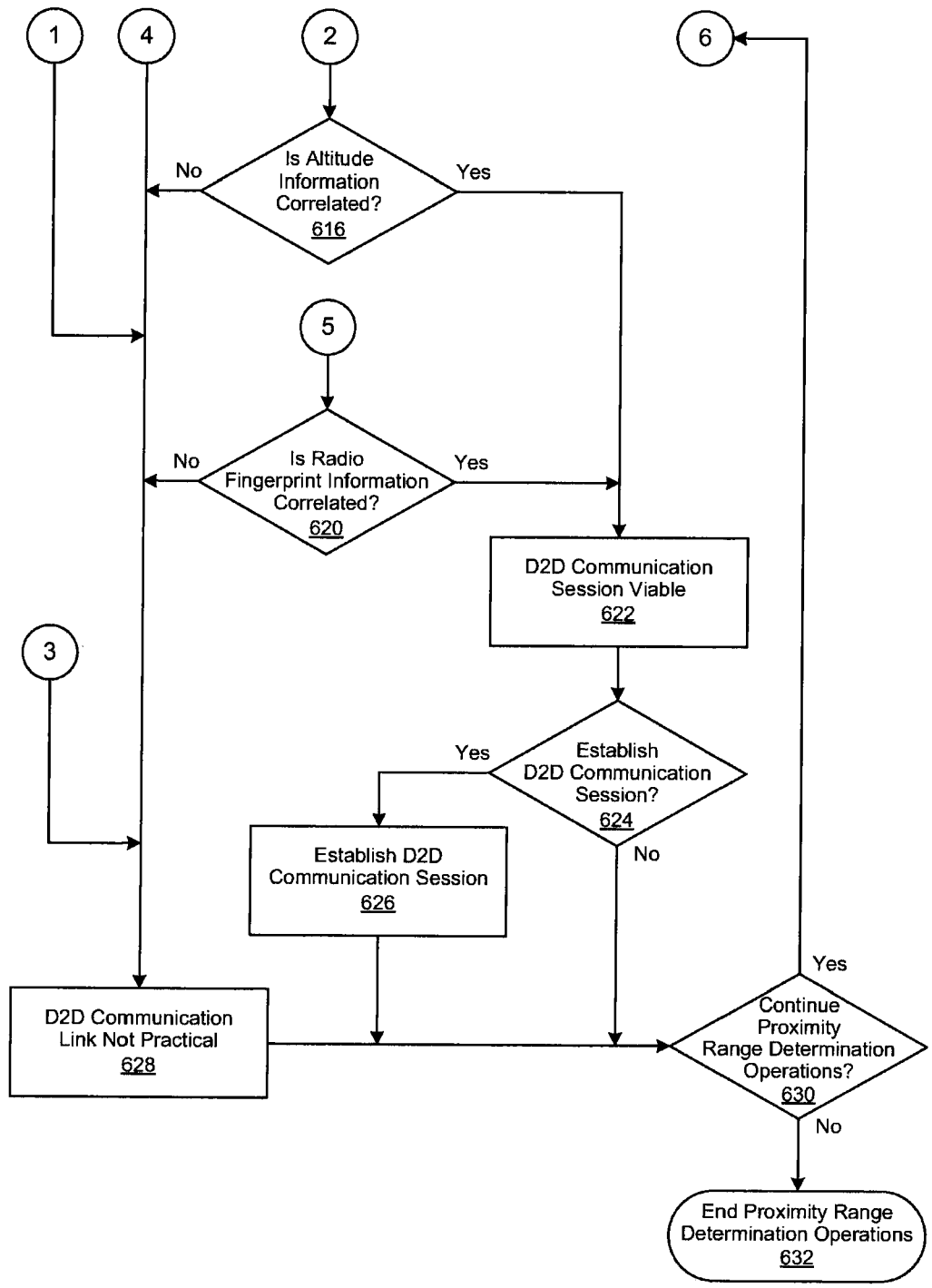

FIGS. 6a and 6b are a generalized flowchart of operations performed by a first client node as implemented in accordance with an embodiment of the disclosure to determine the proximity of a second client node within a wireless-enabled communication environment. In this embodiment, operations to determine the proximity range between a first client node and a second client node are begun in step 602, followed by the acquisition of measurement information in, as described in greater detail herein, for the two client nodes in step 604. A determination is then made in step 606 whether Global Positioning System (GPS) information is available for both client nodes. In various embodiments, the availability of GPS navigational signals to the client nodes serves as a first order estimation of the each client node's location. As an example, the first order estimation may be a current location fix that is of low accuracy, or a fix from some pervious time such as when a client node enters a building. Such GPS fixes may thus indicate that the client nodes are within the same building but not provide their proximity to each other within the building.

If it is determined in step 606 that GPS information is available for both client nodes, then a determination is made in step 612 whether the GPS information associated with the two client nodes correlates, there by indicating they are proximate to one another. If not, then it is determined in step 628 that device-to-device (D2D) communications between the two client nodes is not viable. A determination is then made in step 630 whether to continue proximity range determination operations. If so, then the process is continued, proceeding with step 604. If not, then proximity range determination operations are ended in step 632.

However, if it is determined in step 612 that the GPS information associated with the two client nodes correlates, then a determination is made in step 614 whether altitude information is available for both client nodes. For example, even if GPS signals are available and provide highly accurate positioning information, the corresponding altitude information might not be available. Therefore, if it is determined in step 614 that altitude information for the two client nodes is not available then the process is continued, proceeding with step 628. Otherwise, a determination is made in step 616 whether the altitude information correlates, thereby indicating that the two client nodes are proximate to one another. For example, the error range of the corresponding altitude information might be correspondingly large, such as when the two client nodes are on different levels of a sports stadium or auditorium.

If it is determined in step 616 that the altitude information is not correlated, then the process is continued, proceeding with step 628. Otherwise, it is determined in step 622 that D2D communications between the two client nodes is viable, followed by a determination being made in step 624 whether to establish a D2D communication session. If not, then the process is continued, proceeding with step 630. Otherwise, a D2D communication session is established between the two client nodes in step 626 and the process is continued, proceeding with step 630.

However, if it is determined in step 606 that GPS information is not available for both client nodes then a determination is made in step 608 whether cell and sector identification information is available for both client nodes. For example, if GPS and altitude information are not available, either or both of the client nodes may be indoors or under shadowing. If it is determined in step 608 that cell and sector information is available, then a determination is made in step 610 whether the cell and sector information associated with the two client nodes correlates, thereby indicating that they are proximate to one another. If not, then the process is continued, proceeding with step 628. Otherwise, or if it was determined in step 608 that cell and sector information, or in step 614 that altitude information, is not available for the two nodes, then a determination is made in step 618 whether fingerprint information is available for the two nodes.

In various embodiments, cell site-based location information, which usually is available both indoors and outdoors but has a large estimation error, is used as a second order positioning value when GPS is not available (e.g. spots inside a building and nearby). As described in greater detail herein, local radio measurement fingerprints provide next-level location information in various embodiments. If it is determined in step 618 that radio fingerprint information is not available for both client devices, then the process is continued, proceeding with step 628. Otherwise, a determination is made in step 620 whether the radio fingerprint information associated with the two client nodes correlates, thereby indicating that they are proximate to one another. As an example, client nodes with highly correlated fingerprints are most likely located nearby (e.g. on the same floor). If it is determined in step 620 that the radio fingerprint information is not correlated, then the process is continued, proceeding with step 628, otherwise, it is determined in step 622 that D2D communications between the two client nodes is viable, followed by a determination being made in step 624 whether to establish a D2D communication session. If not, then the process is continued, proceeding with step 630. Otherwise, a D2D communication session is established between the two client nodes in step 626 and the process is continued, proceeding with step 630.

In various embodiments, a client node may not be able to measure any fixed wireless access nodes at its current location. In these embodiments, the client node is not considered to be within a viable D2D communications range of other client nodes associated with its community of interest. For example, this may be the case when some client nodes are inside a building and others are outside. In various other embodiments, it may not be possible to measure the signal strengths of various fixed wireless access nodes. Therefore, they may not be reported. In these embodiments, the matching of fingerprints from different client nodes as described in 620 is based upon the identification of physical wireless access nodes reported by each client node. In various embodiments, the respective signal strengths of mobile wireless access nodes are not reported. In these embodiments, the matching of mobile wireless access nodes is based upon the identification of mobile wireless access nodes reported by each client node.

In one embodiment, the radio measurement fingerprints are compared at a server associated with the wireless network that is accessed via a communication session with the client nodes. In another embodiment, the radio measurement fingerprints are compared within client nodes that receive measurement reports from other client nodes. In various embodiments, a D2D communication session is established in different radio spectrum channels than those of a cellular network. For example, the D2D communication session may use a variety of Public Safety Agency (PSA) channels, Private Mobile Radio (PMR) channels, government channels, satellite channels, or WLAN channels. In various other embodiments, the D2D communication session uses cellular network channels that are available within the coverage area location areas of the client nodes. In some embodiments, the client nodes may use a different mode of the radio access technology (e.g. TDD or FDD) than that used for the mobile wireless network. In certain of these embodiments, the client node appears to the mobile wireless network as a "mobile home-Node-B," or mobile network relay device, and makes use of channels designated by the network operator for those operations. In other embodiments, the D2D communication session makes use of channels supervised by another mobile wireless network operator.

In various embodiments, information is available related to operational the details of the physical wireless network access nodes. For example, there may be locale maps or floor plans indicating the position of the physical wireless network access nodes within a building. The locale map may also include information about walls, doors, windows and interior partitions that may affect the propagation of radio communications signals within the structure. The client may use information about physical wireless network access nodes positions within the building to determine its proximity to other client nodes and in relation to the floor plan. This information may be available from a database of physical wireless network access nodes IDs and floor plans stored in a repository of wireless access node ID, GPS, locale map, and client node fingerprint data as described in greater detail herein. In these various embodiments, the information is provided to the client node using the data communications facilities of an associated communications network. Alternatively, the repository may be preloaded, or otherwise stored, in the client node. Accordingly, the client node matches the physical wireless access node's ID from its fingerprint to those of the building map (i.e., a locale map) to help determine its proximity to other client nodes within the building. It will be appreciated that such information may assist the client node in determining if it is on the same floor as another client node.

Likewise, the presence of walls and other architectural features that affect propagation may also be used to determine the possibility of D2D communications in the presence of these features. Accordingly, the client node may compare pre-stored survey information of measurements (e.g., radio environment fingerprints) made at positions within the building to its measured fingerprints. In some embodiments, the fingerprints stored for comparison would be a subset of the available physical wireless network access nodes, wherein the client node uses only this subset for the purpose of determining is proximity to other client nodes.

Although the described exemplary embodiments disclosed herein are described with reference to determining the proximity of client nodes within a wireless-enabled communication environment, the present disclosure is not necessarily limited to the example embodiments which illustrate inventive features of the present disclosure that are applicable to a wide variety of authentication algorithms. Thus, the particular embodiments disclosed above are illustrative only and should not be taken as limitations upon the present disclosure, as the disclosure may be modified and practiced in different but equivalent manners apparent to those skilled in the art having the benefit of the teachings herein. Accordingly, the foregoing description is not intended to limit the disclosure to the particular form set forth, but on the contrary, is intended to cover such alternatives, modifications and equivalents as may be included within the spirit and scope of the disclosure as defined by the appended claims so that those skilled in the art should understand that they may make various changes, substitutions and alterations without departing from the spirit and scope of the disclosure in its broadest form.

What is claimed is:

1. A client node, comprising:
   a database comprising fingerprint data associated with the client node and a plurality of second client nodes, the fingerprint data including signal strength data of a plurality of communication endpoints measured by each of the client node and the plurality of second client nodes; and
   processing logic configured to process the signal fingerprint data to identify an individual second client node of said plurality of second client nodes within a viable range for device-to-device (D2D) communication, the viable range determined to exist in response to a match between a first fingerprint of the client node and a second fingerprint of the individual second client node, the matching first and second fingerprints indicating that a same set of communication endpoints measured by the client node and the individual second client node have signal strengths that indicate a viable D2D communication range,
   wherein said processing logic is further operable to initiate a D2D communications session with said individual second client node that is within said viable D2D communication range.

2. The client node of claim 1, wherein said database further comprises identification data associated with a plurality of network connectivity devices, and wherein radio signal measurement operations are individually performed by said client node and said plurality of second client nodes to generate radio signal measurement data associated with individual network connectivity devices of said plurality of network connectivity devices.

3. The client node of claim 2, wherein said client node and said second client nodes individually process said identification data and said radio signal measurement data to respectively generate said associated fingerprint data.

4. The client node of claim 1, wherein said processing logic is further operable to process Global Positioning System (GPS) data with said fingerprint data to identify physical locations of said client node and said individual second client node.

5. The client node of claim 4, wherein said GPS information comprises altitude information.

6. The client node of claim 5 wherein said processing logic is further operable to process locale map data with said GPS data and with said fingerprint data to identify said physical locations of said client node and said individual second client node.

7. The client node of claim 4, wherein said identification data, said GPS data, said locale map data, said fingerprint data associated with said plurality of second client nodes, and identification data associated with a plurality of network connectivity devices is communicated and stored in a server node accessible by said client node.

8. The client node of claim 7, wherein said identification data, said GPS data, said locale map data, and said fingerprint data associated with said plurality of second client nodes stored in said server node is downloaded from said server node and stored in said client node.

9. The client node of claim 7, wherein said plurality of network connectivity devices comprises a mobile wireless network access node.

10. The client node of claim 7, wherein said plurality of network connectivity devices comprises a fixed wireless network access node.

11. The client node of claim 1, wherein said initiated D2D communications session comprises one among the set of:
data communications directly between client nodes;
Multiple Input Multiple Output (MIMO) configurations;
Cooperative Multipoint (CoMP) configurations;
Interference Control (IC); and
relaying of information among client nodes.

12. A method for using a client node to initiate a device-to-device (D2D) communications session, the method comprising:
accessing signal fingerprint data associated with the client node and a plurality of second client nodes, the fingerprint data including signal strength data of a plurality of communication endpoints measured by each of the client node and the plurality of second client nodes;
processing the signal fingerprint data to determine whether a match exists between a first fingerprint of the client node and a second fingerprint of an individual second client node of said plurality of second client nodes, wherein matching first and second fingerprints indicate that a same set of communication endpoints measured by the client node and the individual second client node have signal strengths indicating a viable D2D communication range; and
initiating a D2D communications session with said individual second client node upon determining that the individual second client node is within viable D2D communication range when the first fingerprint matches the second fingerprint.

13. The method of claim 12, wherein radio signal measurement operations are individually performed by said client node and said plurality of second client nodes to generate radio signal measurement data associated with individual network connectivity devices of a plurality of network connectivity devices.

14. The method of claim 13, wherein said client node and said individual second client nodes individually process said radio signal measurement data and identification data associated with said plurality of network connectivity devices to respectively generate said associated fingerprint data.

15. The method of claim 12, further comprising processing Global Positioning System (GPS) data with said fingerprint data to identify physical locations of said client node and said individual second client node.

16. The method of claim 15, wherein said GPS information comprises altitude information.

17. The method of claim 16, further comprising processing locale map data with said GPS data and with said fingerprint data to identify said physical locations of said client node and said individual second client node.

18. The method of claim 15, wherein said GPS data, said locale map data, said fingerprint data associated with said plurality of second client nodes, and identification data associated with a plurality of network connectivity devices is communicated and stored in a server node accessible by said client node.

19. The method of claim 18, wherein said identification data, said GPS data, said locale map data, and said fingerprint data associated with said plurality of second client nodes stored in said server node is downloaded from said server node and stored in said client node.

20. The method of claim 18, wherein said plurality of network connectivity devices comprises a mobile wireless network access node.

21. The method of claim 18, wherein said plurality of network connectivity devices comprises a fixed wireless network access node.

22. The method of claim 12, wherein said initiated D2D communications session comprises one among the set of:
data communications directly between client nodes;
Multiple Input Multiple Output (MIMO) configurations;
Cooperative Multipoint (CoMP) configurations;
Interference Control (IC); and
relaying of information among client nodes.

* * * * *